(12) United States Patent
Kamiya et al.

(10) Patent No.: US 7,414,102 B2
(45) Date of Patent: Aug. 19, 2008

(54) POLYMER ELECTROLYTE OF HIGH DURABILITY AND A PRODUCTION PROCESS THEREOF

(75) Inventors: Atsushi Kamiya, Nisshin (JP); Naoki Hasegawa, Kasugai (JP); Satoru Yamamoto, Nagoya (JP); Hisato Takeuchi, Chita (JP); Masaya Kawasumi, Anjyo (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/863,504

(22) Filed: Jun. 9, 2004

(65) Prior Publication Data

US 2005/0004335 A1 Jan. 6, 2005

(30) Foreign Application Priority Data

Jun. 11, 2003 (JP) .............................. 2003-166182

(51) Int. Cl.
*C08F 12/20* (2006.01)
(52) U.S. Cl. ........................ 526/242; 204/252; 204/282; 427/540; 429/30; 429/31
(58) Field of Classification Search ................ 526/242; 204/252, 282; 427/540; 429/30, 31
See application file for complete search history.

(56) References Cited

U.S. PATENT DOCUMENTS

| | | | | |
|---|---|---|---|---|
| 3,041,317 A | * | 6/1962 | Gibbs et al. | .................. 526/243 |
| 3,624,053 A | | 11/1971 | Gibbs et al. | |
| 3,692,569 A | * | 9/1972 | Grot et al. | ................. 428/319.7 |
| 4,940,525 A | * | 7/1990 | Ezzell et al. | ................. 204/252 |
| 5,039,389 A | * | 8/1991 | McMichael | .................. 204/282 |
| 6,080,501 A | * | 6/2000 | Kelley et al. | ................... 429/31 |

FOREIGN PATENT DOCUMENTS

| | | |
|---|---|---|
| JP | SHO48-37395 | 6/1973 |
| JP | 52-028588 | 3/1977 |
| JP | SHO57-31903 | 2/1982 |
| JP | 4-11608 | 1/1992 |
| JP | 2002-105216 | 4/2002 |

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, P.C.

(57) ABSTRACT

A polymer electrolyte of high durability consistent with the present invention is characterized as including a first repeating unit represented by a general formula

—{C(Z_1)(Z_2)—C(Z_3)(Z_4—SO_3H)}—

(where $Z_1$, $Z_2$, $Z_3$, and $Z_4$ are respectively F or $R_{f1}$, F or $R_{f2}$, F or $R_{f3}$, and nothing or $R_{f4}$; and
each of $R_{f1}$ to $R_{f4}$ is a perfluoroalkyl group in which the carbon number is from 1 to 10) in a polymer chain, and having an equivalent weight of 2500 g/eq or less.

10 Claims, 2 Drawing Sheets

POLYMER ELECTROLYTE OF HIGH DURABILITY AND A PRODUCTION PROCESS THEREOF

BACKGROUND OF THE INVENTION

1. Field of the Invention

The present invention relates to a polymer electrolyte of high durability and a production process thereof, more particularly to a polymer electrolyte of high durability which is suitable for an electrolyte membrane, an electrode material and the like for use in polymer electrolyte fuel cells, water electrolyzers, halogen hydracid electrolyzers, sodium chloride electrolyzers, oxide and/or hydrogen concentrators, humidity sensors, gas sensors and the like, and a production process thereof.

2. Description of Related Art

A polymer electrolyte is a polymer material having an electrolyte group such as a sulfonic acid group in a polymer chain. As the polymer electrolyte has properties of strongly bonding to specific ions and selectively permeating cations or anions, it is formed into particles, fibers or membranes, and utilized in various applications such as electrodialysis, diffusion dialysis and cell diaphragms.

For example, in the various electrochemical devices such as the polymer electrolyte fuel cells and the water electrolyzers, the polymer electrolyte is formed into a membrane and used in a state of a membrane-electrode assembly (MEA), where both sides of the polymer electrolyte are bonded with electrodes respectively. Also, in the polymer electrolyte fuel cell, the electrode generally has a two-layered structure consisting of a diffusion layer and a catalyst layer. The diffusion layer is for supplying the catalyst layer with a reaction gas and electrons, and carbon fibers, carbon papers or the like are used as the diffusion layer. Further, the catalyst layer acts as a reaction field of an electrode reaction, and generally consists of a complex of a carbon supporting a catalyst such as platinum and a polymer electrolyte.

As the polymer electrolyte for use in such applications, various materials are conventionally known. For example, for the electrolyte membrane and the electrolyte in the catalyst layer used in the electrochemical devices operating under a severe condition, a wholly fluorinated electrolyte membrane of excellent oxidation resistance is generally used (for example, "Nafion", a registered trademark, manufactured by E. I. du Pont de Nemours & Company Inc., "Aciplex", a registered trademark, manufactured by Asahi Kasei Corporation, "Flemion", a registered trademark, manufactured by Asahi Glass Co., Ltd., and the like), and a hydrocarbon-based electrolyte is also considered for use.

Further, U.S. Pat. No. 3,624,053 discloses a trifluorovinyl sulfonic acid polymer which is obtained by copolymerizing trifluorovinyl sulfonyl fluoride ($CF_2=CFSO_2F$) and tetrafluoroethylene ($CF_2=CF_2$), a molecule of which includes a structure represented by —$CF_2$—$CF(SO_3X)$— (where X is hydrogen, alkaline metal, ammonium ions or amine ions), and equivalent weight of which is about 14000 g/eq (see column 1, lines 60-71 and column 2, lines 34-37).

Furthermore, U.S. Pat. No. 3,041,317 discloses a process of synthesizing fluoroalkenyl sulfonyl fluoride ($R_fCF=CFSO_2F$, where $R_f$ is fluorine, perfluoroalkyl or omega-hydroperfluoroalkyl) which is used for synthesizing the trifluorovinyl sulfonic acid polymer described above (see column 1, lines 41-51).

Still further, Japanese Patent Application Unexamined Publication No. Hei4(1992)-11608 discloses a proton conductor represented by (—$CF_2$—$CF(SO_3H)$—)$_n$ (where n is 100 or more). Moreover, Japanese Patent Application Unexamined Publication No. 2002-105216 discloses sulfonated polychlorotrifluoroethylene obtained by sulfonation of a chloro group in polychlorotrifluoroethylene.

In an operating environment of the polymer electrolyte fuel cell, a peroxide is produced as a side reaction of an electrode reaction. Further, the produced peroxide becomes a peroxide radical while diffusing in the membrane. There has been a problem that the conventional hydrocarbon-based electrolyte is prone to corrosion by the peroxide radical and has low oxidation resistance. This is because a hydrocarbon skeleton constituting the hydrocarbon-based electrolyte is easily subjected to an oxidative reaction by the peroxide radical. Therefore, the wholly fluorinated electrolyte of high chemical stability is generally used as the electrolyte for use in the fuel cell even it is very expensive.

However, inventors of the present invention have found that the wholly fluorinated electrolyte such as Nafion (the registered trademark) also deteriorates with time if it is used for a long time under the operating condition of the fuel cell. Also, a detailed analysis of a cause for the deterioration revealed that an ether linkage in the conventional wholly fluorinated electrolyte often becomes a source of the degradation.

Besides, the trifluorovinyl sulfonic acid polymer disclosed in U.S. Pat. No. 3,624,053 and U.S. Pat. No. 3,041,317 is known as an electrolyte having a structure not including the ether linkage in the molecule. However, there are problems that its equivalent weight is as high as about 14000 g/eq, and sufficient proton conductivity for operating the fuel cell cannot be secured. This is mainly due to low copolymerization reactivity of trifluorovinyl sulfonyl fluoride ($CF_2=CFSO_2F$), which is a monomer.

Further, Japanese Patent Application Unexamined Publication No. Hei4(1992)-11608 discloses the proton conductor represented by (—$CF_2$—$CF(SO_3H)$—)$_n$ (where n is 100 or more) as the electrolyte not including the ether linkage in the molecule. However, specific means for synthesizing such proton conductor is not disclosed therein at all.

SUMMARY OF THE INVENTION

The present invention has been made in view of the above circumstances and has an object to overcome the problems described above and to provide a polymer electrolyte of high durability, which has no ether linkage in a molecule, is composed of fluorocarbon chains and sulfonic acid groups being electrolyte groups, and has high molecular weight and low equivalent weight, and a production process thereof.

To achieve the objects and in accordance with the purpose of the present invention, a polymer electrolyte of high durability includes a first repeating unit represented by a general formula:

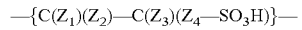

(where $Z_1$, $Z_2$, $Z_3$, and $Z_4$ are respectively F or $R_{f1}$, F or $R_{f2}$, F or $R_{f3}$, and nothing or $R_{f4}$; and each of $R_{f1}$ to $R_{f4}$ is a perfluoroalkyl group in which the carbon number is from 1 to 10 inclusive) in a polymer chain, and has an equivalent weight of 2500 g/eq or less.

In another aspect of the present invention, a production process of a polymer electrolyte of high durability has a first step of synthesizing a polymer compound by polymerizing at least one kind of first monomer represented by a general formula:

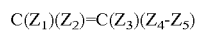

(where $Z_1$, $Z_2$, $Z_3$, and $Z_4$ are respectively F or $R_{f1}$, F or $R_{f2}$, F or $R_{f3}$, and nothing or $R_{f4}$;

$Z_5$ is $-SO_2X$, $-SO_2M_1$, $-SO_3M_2$, or $-SM_3$;

X is Cl, Br or I;

each of $M_1$, $M_2$ and $M_3$ is H, an univalent metal such as Na, K and Li, a bivalent metal such as Ca and Mg, a trivalent metal such as Al, a transition metal such as Fe, Ni and Co, or $R_{f1}$; and each of $R_{f1}$ to $R_{f4}$ and $R_{f7}$ is a perfluoroalkyl group in which the carbon number is from 1 to 10 inclusive), and a second step of converting a functional group $Z_5$ contained in the polymer compound synthesized in the first step into a sulfonic acid group.

The monomer represented by the above-mentioned general formula: $C(Z_1)(Z_2)=C(Z_3)(Z_4-Z_5)$, particularly the monomer in which the functional group $Z_5$ is $-SO_2M_1$, $-SO_3M_2$, or $-SM_3$ has higher reactivity in an unsaturated bond than a perfluorovinyl monomer having a sulfonyl fluoride group ($-SO_2F$). Therefore, when this is used as the first monomer, the electrolyte having high molecular weight and low equivalent weight may be synthesized with relative ease. Further, as the electrolyte thus obtained does not have the ether linkage, the deterioration with time is suppressed even used under the operating condition of the fuel cell.

Yet, in another aspect of the present invention, a production process of a polymer electrolyte of high durability has a first step of synthesizing a polymer compound by copolymerizing at least one kind of first monomer represented by a general formula:

$$C(Z_1)(Z_2)=C(Z_3)(Z_4\text{-}Z_5)$$

(where $Z_1$, $Z_2$, $Z_3$, and $Z_4$ are respectively F or $R_{f1}$, F or $R_{f2}$, F or $R_{f3}$, and nothing or $R_{f4}$;

$Z_5$ is $-SO_2X$, $-SO_2M_1$, $-SO_3M_2$, or $-SM_3$;

X is Cl, Br or I;

each of $M_1$, $M_2$ and $M_3$ is H, an univalent metal such as Na, K and Li, a bivalent metal such as Ca and Mg, a trivalent metal such as Al, a transition metal such as Fe, Ni and Co, or $R_{f7}$; and each of $R_{f1}$ to $R_{f4}$ and $R_{f7}$ is a perfluoroalkyl group in which the carbon number is from 1 to 10 inclusive) with a second monomer represented by a general formula:

$$CF_2=CFZ_6$$

(where $Z_6$ is F or $R_{f6}$;

$R_{f6}$ is a perfluoroalkyl group in which the carbon number is from 1 to 10 inclusive), and a second step of converting a functional group $Z_5$ contained in the polymer compound synthesized in the first step into a sulfonic acid group.

The polymer electrolyte of high durability consistent with the present invention does not have the ether linkage in the molecule, so there is an advantage that even used for a long time under the operating condition of the fuel cell, the deterioration due to the peroxide radical is suppressed. In addition, as it has relatively low equivalent weight, there is an advantage that it shows high proton conductivity.

Further, in the production process of the polymer electrolyte of high durability consistent with the present invention, the first monomer with high reactivity which includes a predetermined functional group is used as a starting material; therefore, there is an advantage that the polymer electrolyte having high molecular weight and low equivalent weight may be synthesized with relative ease. Furthermore, as the first monomer has no ether linkage in the molecule, there is an advantage that the polymer electrolyte is obtained which is highly resistant to the peroxide radical.

Additional objects and advantages of the invention are set forth in the description which follows, are obvious from the description, or may be learned by practicing the invention. The objects and advantages of the invention may be realized and attained by the polymer electrolyte of high durability and the production process thereof in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
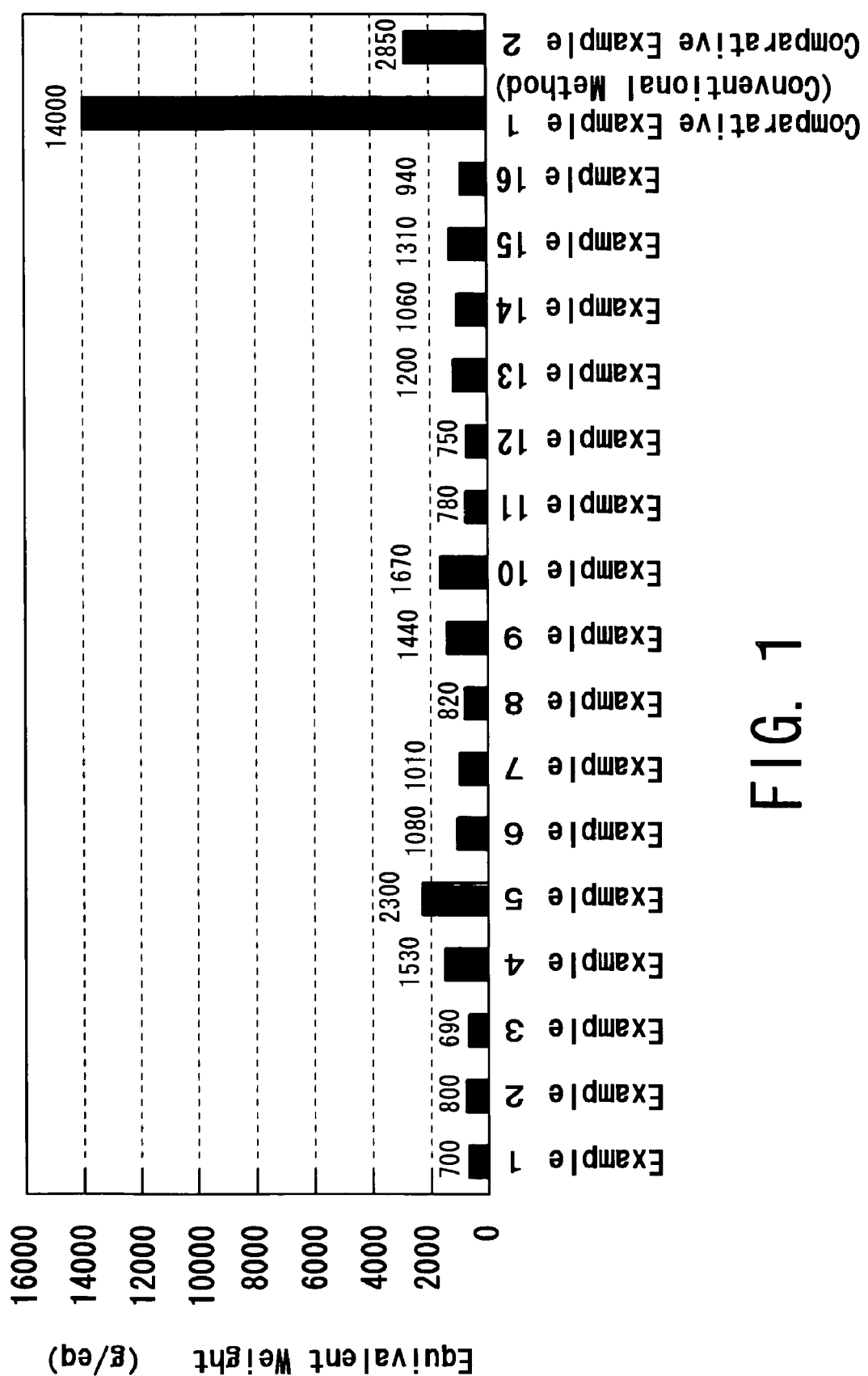
FIG. 1 is a graph illustrating equivalent weight of membranes obtained in Examples 1 to 15, and Comparative Examples 1 and 2.

A detailed description of one preferred embodiment of a polymer electrolyte of high durability and a production process thereof embodied by the present invention is provided below with reference to the accompanying drawings.

The polymer electrolyte of high durability consistent with the present invention is characterized as including a first repeating unit represented by a general formula shown in the following Chemical formula 1 in polymer chains, and having an equivalent weight of 2500 g/eq or less.

$$-\{C(Z_1)(Z_2)-C(Z_3)(Z_4-SO_3H)\}- \quad \text{[Chemical formula 1]}$$

(where $Z_1$, $Z_2$, $Z_3$, and $Z_4$ are respectively F or $R_{f1}$, F or $R_{f2}$, F or $R_{f3}$, and nothing or $R_{f4}$; and each of $R_{f1}$ to $R_{f4}$ is a perfluoroalkyl group in which the carbon number is from 1 to 10 inclusive.)

The first repeating unit represented by Chemical formula 1 specifically has the following structure:

$$-\{CF_2-CF(SO_3H)\}-, \text{ or}$$

$$-\{CF_2-CF(R_{f4}-SO_3H)\}-; \quad (1)$$

$$-\{CF(R_{f1} \text{ or } R_{f2})-CF(SO_3H)\}-,$$

$$-\{CF_2-C(R_{f3})(SO_3H)\}-,$$

$$-\{CF(R_{f1}, \text{ or } R_{f2})-CF(R_{f4}-SO_3H)\}-, \text{ or}$$

$$-\{CF_2-C(R_{f3})(R_{f4}-SO_3H)\}-; \quad (2)$$

$$-\{C(R_{f1})(R_{f2})-CF(SO_3H)\}-,$$

$$-\{CF(R_{f1} \text{ or } R_{f2})-C(R_{f3})(SO_3H)\}-,$$

$$-\{C(R_{f1})(R_{f2})-CF(R_{f4}-SO_3H)\}-, \text{ or}$$

$$-\{CF(R_{f1} \text{ or } R_{f2})-C(R_{f3})(R_{f4}-SO_3H)\}-; \text{ or} \quad (3)$$

$$-\{C(R_{f1})(R_{f2})-C(R_{f3})(SO_3H)\}-, \text{ or}$$

$$-\{CF(R_{f1})(R_{f2})-C(R_{f3})(R_{f4}-SO_3H)\}-. \quad (4)$$

The polymer electrolyte of high durability consistent with the present invention may include either only one kind or more than two kinds of first repeating unit mentioned above in the polymer chains. Further, it may be a complex of first polymer chains including one or more kinds of first repeating unit and one or more kinds of other polymer chain including one or more kinds of first repeating unit different from those included in the first polymer chains.

Further, the polymer electrolyte of high durability consistent with the present invention may be a homopolymer consisting of the first repeating unit only, or a copolymer including the first repeating unit and a second repeating unit different therefrom.

Specifically, the second repeating unit constituting the polymer chains is suitably the one represented by a general formula shown in the following Chemical formula 2:

—(CF$_2$—CFZ$_6$)— [Chemical formula 2]

(where Z$_6$ is F or R$_{f6}$; and

R$_{f6}$ is a perfluoroalkyl group in which the carbon number is from 1 to 10 inclusive.)

Incidentally, the "perfluoroalkyl group" is specifically the group represented by a general formula such as —C$_n$F$_{2n}$— (1≦n≦10) and —C$_n$F$_{2n+1}$— (1≦n≦10). Structures of the perfluoroalkyl groups R$_{f1}$ to R$_{f4}$ and R$_{f6}$ are not specifically limited, and may have a straight-chained structure, a branched structure or an annular structure. In addition, R$_{f1}$, R$_{f2}$, R$_{f3}$ and R$_{f6}$ may have the structures either identical to or different from each other.

Further, referring to Chemical formulae 1 and 2, as the carbon number n in the perfluoroalkyl groups R$_{f1}$ to R$_{f4}$ and R$_{f6}$ becomes large, crystallinity of the polymer electrolyte generally degrades, and when the polymer electrolyte is formed into a membrane, mechanical strength and/or thermal resistance of the electrolyte membrane tend to degrade. Therefore, in order to obtain an electrolyte membrane which is excellent in the mechanical strength and/or the thermal resistance, the carbon number n in the respective perfluoroalkyl groups R$_{f1}$ to R$_{f4}$ and R$_{f6}$ is preferably 5 or less, more preferably 3 or less.

It is essential only that a ratio of the first repeating unit to the second repeating unit included in the polymer chains is at least such that the equivalent weight is 2500 g/eq or less. In order to obtain a polymer electrolyte of high durability particularly suitable for an electrolyte membrane for use in a polymer electrolyte fuel cell, the ratio of the first repeating unit included in the polymer chains when converted to the equivalent weight is preferably 2000 g/eq or less, more preferably 1500 g/eq or less.

In addition, the polymer chains constituting the polymer electrolyte consistent with the present invention have a molecular structure in structure chain form because of the production process described later. The structure in straight chain does not have a side-chain in which the molecular weight exceeds 1000 (or the branched structure).

Further, the polymer chains constituting the polymer electrolyte consistent with the present invention may include a base material consisting of a wholly fluorinated polymer or a partially fluorinated polymer. The wholly fluorinated polymer refers to a polymer including a C—F bond and not including a C—H bond. On the other hand, the partially fluorinated polymer refers to a polymer including both the C—F bond and the C—H bond.

In this case, the polymer electrolyte of high durability consistent with the present invention may be obtained by graft polymerization of the base material and a first monomer. As for the graft polymerization, a known method may be employed such as a thermal polymerization method, a photopolymerization method, a radiation polymerization method and a radical polymerization method.

Generally, in the polymer electrolyte, as the molecular weight increases, the higher mechanical strength is obtained. According to the production process described later, the polymer electrolyte having relatively high molecule weight may be synthesized with relative ease.

Next, the production process of the polymer electrolyte of high durability consistent with the present invention will be described hereinafter. The production process includes the first step and the second step.

In the first step, at least one kind of a first monomer represented by a general formula shown in the following Chemical formula 3 is polymerized to synthesize a polymer compound.

C(Z$_1$)(Z$_2$)=C(Z$_3$)(Z$_4$-Z$_5$) [Chemical formula 3]

(where Z$_1$, Z$_2$, Z$_3$, and Z$_4$ are respectively F or R$_{f1}$, F or R$_{f2}$, F or R$_{f3}$, and nothing or R$_{f4}$;

Z$_5$ is —SO$_2$X, —SO$_2$M$_1$, —SO$_3$M$_2$ or —SM$_3$;

X is Cl, Br or I;

each of M$_1$, M$_2$ and M$_3$ is H, an univalent metal such as Na, K and Li, a bivalent metal such as Ca and Mg, a trivalent metal such as Al, a transition metal such as Fe, Ni and Co, or R$_{f7}$; and each of R$_{f1}$ to R$_{f4}$, R$_{f7}$ is a perfluoroalkyl group in which the carbon number is from 1 to 10 inclusive.)

The first monomer in which a functional group Z$_5$ is a sulfonyl halide group (—SO$_2$X) specifically has the following structure:

CF$_2$=CFSO$_2$X,

CF(R$_{f1}$ or R$_{f2}$)=CFSO$_2$X,

CF$_2$=C(R$_{f3}$)SO$_2$X,

C(R$_{f1}$)(R$_{f2}$)=CFSO$_2$X,

CF(R$_{f1}$ or R$_{f2}$)=C(R$_{f3}$)SO$_2$X, or

C(R$_{f1}$)(R$_{f2}$)=C(R$_{f3}$)SO$_2$X; or (1)

CF$_2$=CF(R$_{f4}$—SO$_2$X),

CF(R$_{f1}$, or R$_{f2}$)=CF(R$_{f4}$—SO$_2$X),

CF$_2$=C(R$_{f3}$)(R$_{f4}$—SO$_2$X),

C(R$_{f1}$)(R$_{f2}$)=CF(R$_{f4}$—SO$_2$X),

CF(R$_{f1}$, or R$_{f2}$)=C(R$_{f3}$)(R$_{f4}$—SO$_2$X), or

C(R$_{f1}$)(R$_{f2}$)=C(R$_{f3}$)(R$_{f4}$—SO$_2$X). (2)

The first monomer in which the functional group Z$_5$, is a sulfonic acid group or its derivative (—SO$_2$M$_1$) specifically has the following structure:

CF$_2$=CFSO$_2$M$_1$,

CF(R$_{f1}$, or R$_{f2}$)=CFSO$_2$M$_1$,

CF$_2$=C(R$_{f3}$)SO$_2$M$_1$,

C(R$_{f1}$)(R$_{f2}$)=CFSO$_2$M$_1$,

CF(R$_{f1}$, or R$_{f2}$)=C(R$_{f3}$)SO$_2$M$_1$, or

C(R$_{f1}$)(R$_{f2}$)=C(R$_{f3}$)SO$_2$M$_1$; or (3)

$CF_2=CF(R_{f4}-SO_2M_1)$, $CF(R_{f1} \text{ or } R_{f2})=CF(R_{f4}-SO_2M_1)$, $CF_2=C(R_{f3})(R_{f4}-SO_2M_1)$, $C(R_{f1})(R_{f2})=CF(R_{f4}-SO_2M_1)$, $CF(R_{f1} \text{ or } R_{f2})=C(R_{f3})(R_{f4}-SO_2M_1)$, or $C(R_{f1})(R_{f2})=C(R_{f3})(R_{f4}-SO_2M_1)$.  (4)

The first monomer in which the functional group $Z_5$ is a sulfonic acid group or its derivative ($-SO_3M_2$) specifically has the following structure:

$CF_2=CFSO_3M_2$, $CF(R_{f1} \text{ or } R_{f2})=CFSO_3M_2$, $CF_2=C(R_{f3})SO_3M_2$, $C(R_{f1})(R_{f2})=CFSO_3M_2$, $CF(R_{f1}, \text{ or } R_{f2})=C(R_{f3})SO_3M_2$, or $C(R_{f1})(R_{f2})=C(R_{f3})SO_3M_2$; or  (5)

$CF_2=CF(R_{f4}-SO_3M_2)$, $CF(R_{f1} \text{ or } R_{f2})=CF(R_{f4}-SO_3M_2)$, $CF_2=C(R_{f3})(R_{f4}-SO_3M_2)$, $C(R_{f1})(R_{f2})=CF(R_{f4}-SO_3M_2)$, $CF(R_{f1}, \text{ or } R_{f2})=C(R_{f3})(R_{f4}-SO_3M_2)$, or $C(R_{f1})(R_{f2})=C(R_{f3})(R_{f4}-SO_3M_2)$.  (6)

The first monomer in which the functional group $Z_5$, is a thiol group or its derivative ($-SM_3$) specifically has the following structure:

$CF_2=CFSM_3$, $CF(R_{f1}, \text{ or } R_{f2})=CFSM_3$, $CF_2=C(R_{f3})SM_3$, $C(R_{f1})(R_{f2})=CFSM_3$, $CF(R_{f1}, \text{ or } R_{f2})=C(R_{f3})SM_3$, or $C(R_{f1})(R_{f2})=C(R_{f3})SM_3$; or  (7)

$CF_2=CF(R_{f4}-SM_3)$, $CF(R_{f1}, \text{ or } R_{f2})=CF(R_{f4}-SM_3)$, $CF_2=C(R_{f3})(R_{f4}-SM_3)$, $C(R_{f1})(R_{f2})=CF(R_{f4}-SM_3)$, $CF(R_{f1}, \text{ or } R_{f2})=C(R_{f3})(R_{f4}-SM_3)$, or $C(R_{f1})(R_{f2})=C(R_{f3})(R_{f4}-SM_3)$.  (8)

Among them, the monomer in which the functional group $Z_5$ is the sulfonic acid group or its derivative ($-SO_2M_1$), the sulfonic acid group or its derivative ($-SO_3M_2$), or the thiol group or its derivative ($-SM_3$) has high reactivity in the unsaturated bond, and the functional group $Z_5$ is convertible into the sulfonic acid group with relative ease after a polymerization reaction. Therefore, it is suitable for the first monomer to produce the polymer electrolyte of high durability consistent with the present invention.

The polymer electrolyte of high durability consistent with the present invention may be a homopolymer where any one kind of first monomer mentioned above is polymerized, or may be a copolymer where more than two kinds thereof are polymerized. Further, the polymer electrolyte of high durability consistent with the present invention may be a polymer obtained from one or more kinds of first monomer, or may be a copolymer obtained from one or more kinds of first monomer and another monomer (hereinafter referred to as a "second monomer").

As the second monomer, specifically, the ones represented by a general formula shown in the following Chemical formula 4 are suitable.

$CF_2=CFZ_6$  [Chemical formula 4]

(where $Z_6$ is F or $R_{f6}$; and $R_{f6}$ is a perfluoroalkyl group in which the carbon number is from 1 to 10 inclusive.)

Among the monomers represented by Chemical formula 4, tetrafluoroethylene ($CF_2=CF_2$) and hexafluoropropylene ($CF_2=CFCF_3$) are relatively inexpensive, and they are particularly suitable for the second monomer.

In the case of copolymerizing the first monomer and the second monomer, any one kind of monomer mentioned above may be used as the second monomer, or more than two kinds thereof may be combined and used.

Besides, among the above-mentioned first monomers, the monomer including a sulfonic acid group ($-SO_3H$) may be synthesized by a publicly known method, since a production method of the monomer including a sulfonyl fluoride group ($-SO_2F$) being a sulfonic acid group precursor and a method of converting it into the sulfonic acid group ($-SO_3H$) are publicly known.

For instance, the first monomer including the sulfonic acid group ($-SO_3H$) is obtained as follows. First, fluoroalkenyl sulfonyl fluoride ($R_fCF=CFSO_2F$) is synthesized by the method disclosed in U.S. Pat. No. 3,041,317 above, and reacted with a mixed solution of potassium hydroxide (KOH)/dimethyl sulfoxide (DMSO)/water ($H_2O$), then reacted with a nitrate aqueous solution of 15% by weight to convert the sulfonyl fluoride group ($-SO_2F$) into the sulfonic acid group ($-SO_3H$)

Further, for instance, the first monomer including a sulfonyl chloride group ($-SO_2Cl$) is obtained by synthesizing fluoroalkenyl sulfonic acid ($R_fCF=CF-SO_3H$) and reacting it with a $PCl_5/POCl_2$ solution to convert the sulfonic acid group ($-SO_3H$) into the sulfonyl chloride group ($-SO_2Cl$).

Furthermore, for instance, the first monomer including a sulfonic acid sodium group ($-SO_3Na$) is obtained by synthesizing fluoroalkenyl sulfonic acid ($R_fCF=CF-SO_3H$), and reacting it with a 1N NaOH aqueous solution to convert the sulfonic acid group ($-SO_3H$) into the sulfonic acid sodium group ($-SO_3Na$).

A polymerization method for the first monomer, and the second monomer to be added as needed, is not specifically limited, and a publicly known method may be used such as a solution polymerization method, an emulsion polymerization method, a suspension polymerization method, an iodine transfer polymerization method and a supercritical fluid solvent polymerization method. As the specific polymerization method and a polymerization condition, optimum method and condition are selected based on the kinds of first and second monomers, their ratio and the like.

Further, when the kind of the first monomer and/or second monomer, the ratio of the first monomer to the second monomer, the polymerization condition and the like are optimized, the polymer electrolyte of high durability is obtained, which has a predetermined average molecular weight and in which an amount of the functional group $Z_5$ in the polymer chains is 2500 g/eq or less when converted to the equivalent weight.

Generally, the higher the ratio of the first monomer in a starting material becomes, the polymer electrolyte having lower equivalent weight is obtained. In addition, the longer the reaction time is, the polymer electrolyte having higher molecular weight is obtained.

Next, the second step will be described hereinafter. In the second step, the functional group $Z_5$ contained in the polymer compound obtained in the first step is converted into the sulfonic acid group ($-SO_3H$). The functional group $Z_5$ may be converted into the sulfonic acid group ($-SO_3H$) using a predetermined reagent. The optimum reagent for the conversion is selected according to the kind of the functional group $Z_5$.

For example, if the functional group $Z_5$, is the sulfonyl halide group ($-SO_2Cl$, $-SO_2Br$, or $-SO_2I$), the polymer compound obtained in the first step may be simply treated with an acid such as a hydrochloric acid, a sulfuric acid and a nitric acid. Alternatively, the polymer compound obtained in the first step may be firstly treated with hydrogen peroxide ($H_2O_2$), and subsequently treated with the acid. Moreover, the polymer compound obtained in the first step may be saponified by sodium hydroxide (NaOH), potassium hydroxide (KOH) or the like so that the sulfonyl halide group ($-SO_2X$) is converted into sulfonate ($-SO_3Na$, $-SO_3K$ or the like), and then subjected to the acid treatment for protonation.

Furthermore, for instance, if the functional group $Z_5$ is the sulfonic acid group ($-SO_2H$) or the thiol group ($-SH$), the polymer compound obtained in the first step may be treated with a hydrogen peroxide ($H_2O_2$) solution for conversion into the sulfonic acid group ($-SO_3H$).

Still further, for instance, if the functional group $Z_5$ is sulfinate ($-SO_2Na$, $-SO_2K$ or the like) or thiol salt ($-SNa$, $-SK$ or the like), the polymer compound obtained in the first step may be treated with the hydrogen peroxide ($H_2O_2$) solution first, and subsequently treated with the acid for conversion into the sulfonic acid group ($-SO_3H$).

Incidentally, if the polymer electrolyte of high durability consistent with the present invention is used in membrane form, the membrane maybe formed either before or after the second step. In addition, if an intermediate product is produced during the second step, the membrane may be formed from a state of the intermediate product. The membrane may be formed by dissolving the polymer compound synthesized in the first step, the polymer electrolyte to which the sulfonic acid group is introduced in the second step or the intermediate product obtained in the second step in an appropriate solvent, and casting it. Also, if the polymer compound, the polymer electrolyte or the intermediate product is capable of melting, the membrane may be cast from a molten state.

Further, if the first monomer has the sulfonic acid group ($-SO_3H$), the second step may be omitted.

Furthermore, referring to Chemical formulae 3 and 4 generally, as mentioned above, as the carbon number n in the perfluoroalkyl groups $R_{f1}$ to $R_{f4}$, $R_{f6}$ and $R_{f7}$ increases, the crystallinity of the polymer electrolyte is prone to be lowered, and when it is formed into the membrane, the mechanical strength and/or the thermal resistance of the electrolyte membrane is prone to degrade. Also, in order to obtain the electrolyte membrane that is excellent in the mechanical strength and/or the thermal resistance, the carbon number n in the perfluoroalkyl groups $R_{f1}$ to $R_{f4}$, $R_{f6}$ and $R_{f7}$ is preferably 5 or less, more preferably 3 or less.

Hereinafter, effects of the polymer electrolyte of high durability and the production process thereof consistent with the present invention will be described. Conventionally, in the polymer electrolyte fuel cell, the wholly fluorinated electrolyte such as Nafion (the registered trademark) that is excellent in the oxidization resistance has been generally used. This is because it has been considered that the conventional wholly fluorinated electrolyte is highly resistant to the hydrogen peroxide radical, and does not deteriorate even used for a long time under the operating condition of the fuel cell.

However, the inventors of the present application have found that even in the case of the wholly fluorinated electrolyte such as Nafion, if it is used for a long time under the operating condition of the fuel cell, the membrane deteriorates, and output of the fuel cell deteriorates with time. Further, detailed investigation of the cause revealed that the deterioration is initiated and progressed by the hydrogen peroxide-derived radical generated at the electrodes at the time of power generation. Also, the analysis on a resolved material and the quantum chemistry calculation showed that an ether linkage in the conventional wholly fluorinated electrolyte such as Nafion often becomes a source of the deterioration.

The polymer electrolyte of high durability consistent with the present invention is synthesized from the first monomer, and the second monomer to be added as needed. The polymer chains thereof has a structure consisting of a fluorocarbon principal chain which is chemically stable and a sulfonic acid group which is an electrolyte group (acid group), and has no ether linkage inside. Therefore, it has higher chemical stability than the conventional wholly fluorinated electrolyte containing the ether linkage. Further, owing to this structure, the deterioration due to the peroxide radical is suppressed even used for a long time under the operating condition of the fuel cell to enable stable long-term operation.

In addition, trifluorovinyl sulfonyl fluoride ($CF_2=CFSO_2F$) disclosed in U.S. Pat. No. 3,624,053 has lower reactivity in the unsaturated bond than tetrafluoroethylene ($CF_2=CF_2$), and it is inferior in polymerization or copolymerization reactivity.

Therefore, it is difficult to synthesize the polymer with high molecular weight only from trifluorovinyl sulfonyl fluoride. Additionally, when copolymerized with tetrafluoroethylene or the like, trifluorovinyl sulfonyl fluoride becomes hard to be trapped in the polymer chains. Thus, it is difficult to synthesize the polymer electrolyte having low equivalent weight according to the method disclosed in U.S. Pat. No. 3,624,053.

On the other hand, a perfluorovinyl monomer consisting of the sulfonyl halide group ($-SO_2X$) except for the sulfonyl fluoride group ($-SO_2F$), the sulfonic acid group or its derivative ($-SO_2M_1$), the sulfonic acid group or its derivative ($-SO_3M_2$), or the thiol group or its derivative ($-SM_3$) has higher reactivity of a polymer growing chain terminal with the monomer and lower steric hindrance than a trifluorovinyl sulfonyl fluoride monomer. In other words, these monomers have excellent polymerization and copolymerization reactivity.

Therefore, when these monomers are used as the first monomer, the polymer with high molecular weight may be synthesized with relative ease. In addition, if the synthesized polymer is copolymerized with the second monomer such as tetrafluoroethylene, a relatively large amount of the first monomer is trapped in the polymer chains, so that the polymer electrolyte having low equivalent weight may be obtained.

Further, when the polymer electrolyte thus obtained is used as the electrolyte membrane for the fuel cell, its initial performance is better than the polymer electrolyte disclosed in U.S. Pat. No. 3,624,053, and equivalent or better than Nafion and the like. Furthermore, its durability is more excellent than Nafion and the like because no ether linkage is in the molecule.

Furthermore, the first and second monomers are easily synthesized and low in cost compared with the monomers having the ether linkage in the molecule such as a Nafion monomer. Therefore, the polymer electrolyte of high durability consistent with the present invention can be lowered in cost as compared with the conventional wholly fluorinated electrolyte such as Nafion.

[Preferred Embodiment]

EXAMPLE 1

Solution Polymerization Method (1)

800 ml of 1,1,2-trichlor-1,2,2-trifluoroethane ($CFCl_2CF_2Cl$, hereinafter referred to as "TCTFE") as a solvent and 18 g of perfluorovinyl sulfonyl chloride ($CF_2=CFSO_2Cl$) as a first monomer were put in a deaerated stainless-steel autoclave having the internal volume of 1 liter. Temperature of the mixture was elevated to 60° C. and a speed of a mixer was set at about 500 rpm. As a second monomer, 10 g of tetrafluoroethylene ($CF_2=CF_2$, hereinafter referred to as "TFE") was added to the mixture.

Next, bisperfluoropropionyl peroxide ($CF_3CF_2C(=O)OOC(=O)CF_2CF_3$) being a polymerization initiator was added to TCTFE to prepare a solution having the concentration of 0.001 g/ml (hereinafter referred to as the "peroxide solution"). Then 25 ml of the peroxide solution was poured into the autoclave for polymerizing two monomers.

Incidentally, the polymerization was performed while consecutively supplying the first and second monomers to the autoclave at a ratio of 9 to 5 so as to keep a pressure inside the autoclave constant. Further, after the initiation of the polymerization reaction, 7.5 ml of the peroxide solution was added into the autoclave every ten minutes for suppressing the lowering of the reaction speed of the polymerization.

After the polymerization reaction was continued for 70 minutes in total, the contents of the autoclave were transferred to a large stainless-steel beaker. Further, the resulting contents were dried at 80° C. in a vacuum dryer for one night to obtain a polymer compound having a sulfonyl chloride group ($-SO_2Cl$ group) as a functional group $Z_5$.

EXAMPLE 2

Solution Polymerization Method (2)

A polymer compound having a sulfonyl chloride group ($-SO_2Cl$ group) as a functional group $Z_5$, was synthesized according to the same procedures as in Example 1 except that the weight of a first monomer firstly put in an autoclave was 23 g, and the weight ratio of the first monomer to a second monomer added during the polymerization reaction was made 23 to 10.

EXAMPLE 3

Solution Polymerization Method (3)

800 ml of TCTFE as a solvent and 11 g of perfluorovinyl thiol ($CF_2=CFSH$) as a first monomer were put in a deaerated stainless-steel autoclave having the internal volume of 1 liter. Further, as a second monomer, 15 g of hexafluoropropylene ($CF_2=CFCF_3$, referred to as "HFP") was added to the mixture.

Next, 25 ml of the peroxide solution used in Example 1 was added to the mixture to cause the polymerization reaction. Incidentally, the polymerization was performed while consecutively supplying the first and second monomers to the autoclave at a ratio of 11 to 15 so as to keep a pressure inside the autoclave constant. Further, after the initiation of the polymerization reaction, 5 ml of the peroxide solution was added into the autoclave every ten minutes for suppressing the lowering of the reaction speed of the polymerization.

After the polymerization reaction was continued for 60 minutes in total, the contents of the autoclave were transferred to a large stainless-steel beaker. Further, the resulting contents were dried at 80° C. in a vacuum dryer for one night to obtain a polymer compound having a thiol group ($-SH$ group) as a functional group $Z_5$.

EXAMPLE 4

Solution Polymerization Method (4)

A polymer compound having a sulfonic acid sodium group ($-SO_3Na$ group) as a functional group $Z_5$ was synthesized according to the same procedures as in Example 3 except that perfluorovinyl sulfonic acid sodium ($CF_2=CFSO_3Na$) was employed as a first monomer, the weight of the first monomer firstly put in an autoclave was 18 g, and the weight ratio of the first monomer to a second monomer added during the polymerization reaction was made 18 to 10.

EXAMPLE 5

Emulsion Polymerization Method (1)

0.51 liter of deoxidized purified water as a solvent and 1 g of ammonium perfluoro(propoxypropionate) ($CF_3-CF_2-CF_2-O-CF_2-CF_2-COO \cdot NH_4$) as an emulsifier were put in a deaerated stainless-steel autoclave having the internal volume of 1 liter. After the inside of the device was substituted by nitrogen, 1.7 ml of dichloromethane ($CH_2Cl_2$) as a chain transfer agent, 18 g of perfluorovinyl sulfonyl chloride ($CF_2=CFSO_2Cl$) as a first monomer, and 10 g of TFE as a second monomer were further added to the polymerized solution.

Next, the temperature in the autoclave was elevated to 30° C., and polymerization was performed for 25 minutes thereafter while continuously supplying a potassium permanganate ($KMnO_4$) aqueous solution having the concentration of 15% by weight, which is a polymerization initiator, using a pump (0.43 ml/min). Upon completion of the reaction, the contents of the autoclave were transferred to a large stainless-steel beaker. Further, the resulting contents were dried at 80° C. in a vacuum dryer for one night to obtain a polymer compound having a sulfonyl chloride group ($-SO_2Cl$ group) as a functional group $Z_5$.

EXAMPLE 6

Emulsion Polymerization Method (2)

A polymer compound having a thiol group (—SH group) as a functional group $Z_5$ was synthesized according to the same procedures as in Example 5 except that perfluorovinyl thiol ($CF_2$=CFSH) was employed as a first monomer, and 2 ml of dichloromethane ($CH_2Cl_2$), 11 g of the first monomer and 10 g of a second monomer were added to the polymerized solution.

EXAMPLE 7

Emulsion Polymerization Method (3)

0.5 liter of deoxidized purified water as a solvent was put in a deaerated stainless-steel autoclave having the internal volume of 1 liter, and the inside of the device was substituted by nitrogen. Next, 1.7 ml of dichloromethane ($CH_2Cl_2$) as a chain transfer agent, 20 g of perfluvinyl sulfonc acid potassium ($CF_2$=$CFSO_3K$) as a first monomer and an emulsifier, and 10 g of TFE as a second monomer were further put in the polymerized solution, and the temperature was heated to 30° C.

Successively, the polymerization was performed for 60 minutes while continuously supplying a potassium permanganate ($KMnO_4$) aqueous solution having the concentration of 15% by weight as a polymerization initiator, using a pump (0.4 ml/min). Upon completion of the reaction, the contents of the autoclave were transferred to a large stainless-steel beaker. Further, the resulting contents were dried at 80° C. in a vacuum dryer for one night to obtain a polymer compound having a potassium sulfonic acid group (—$SO_3K$ group) as a functional group $Z_5$.

EXAMPLE 8

Suspension Polymerization Method (1)

100 ml of deoxidized purified water as a solvent and 2.4 g of di-tert-buthyl peroxide ($C(CH_3)_3OOC(CH_3)_3$) as a polymerization initiator were put in a deaerated stainless-steel autoclave having the internal volume of 1 liter. Next, 18 g of perfluorovinyl sulfonyl chloride ($CF_2$=$CFSO_2Cl$) as a first monomer and 35 g of TFE as a second monomer were further put in the polymerized solution.

The autoclave was closed, placed on a horizontally shaking device, and heated at 122-124° C. for 18.5 hours for polymerization. Upon completion of the reaction, the contents of the autoclave were transferred to a large stainless-steel beaker. Further, the resulting contents were dried at 80° C. in a vacuum dryer for one night to obtain a polymer compound having a sulfonyl chloride group (—$SO_2Cl$ group) as a functional group $Z_5$.

EXAMPLE 9

Suspension Polymerization Method (2)

A polymer compound having a sulfonyl chloride group (—$SO_2Cl$ group) as a functional group $Z_5$, was synthesized according to the same procedures as in Example 8 except that the weight of a first monomer put in an autoclave was 20 g.

EXAMPLE 10

Suspension Polymerization Method (3)

100 ml of deoxidized purified water as a solvent and 1 g of di-tert-buthyl peroxide ($C(CH_3)_3OOC(CH_3)_3$) as a polymerization initiator were put in a stainless-steel autoclave having the internal volume of 1 liter. Then, the autoclave was deaerated and placed in a heating jacket on a shaking device.

Next, 11 g of perfluorovinyl thiol ($CF_2$=CFSH) as a first monomer was put in the autoclave, and the autoclave was connected to a TFE cylinder compressed by a stainless-steel pipe. After the autoclave was heated to 123° C. and the TFE cylinder was opened, polymerization was performed while keeping the temperature at 125° C. for 20 hours. Upon completion of the reaction, a precipitated polymer was subjected to vacuum filtration, further washed and dried to obtain a polymer compound having a thiol group (—SH group) as a functional group

EXAMPLE 11

Iodine Transfer Polymerization Method (1)

4.50 g of 1-iodoperfluorobutane ($CF_3CF_2CF_2CF_2I$) as a polymerization initiator, and 18 g of perfluorovinyl sulfonyl chloride ($CF_2$=$CFSO_2Cl$) as a first monomer were put in a deaerated stainless-steel autoclave having the internal volume of 1 liter. Then, the autoclave was heated to 40° C.

Next, after 10 g of TFE as a second monomer was press-fitted into the autoclave, 5 ml of a solution (hereinafter referred to as an "IPP solution") as a polymerization initiator obtained by mixing 5.36 g of bis-isopropionyl peroxide (($CH_3)_2$CHOC(=O)OOC(=O)CH($CH_3)_2$, hereinafter referred to as "IPP") with 78.2 g of AK225 ($CClF_2CF_2CHClF$, manufactured by Asahi Glass Co., Ltd.) was further press-fitted into initiate polymerization.

As the polymerization reaction proceeds, a polymerization speed is lowered; therefore, the IPP solution was further added to the autoclave for continuing the polymerization. The polymerization was stopped 10 hours later. Upon completion of the reaction, the contents of the autoclave were transferred to a large stainless-steel beaker. Further, the resulting contents were dried at 80° C. in a vacuum dryer for one night to obtain a polymer compound having a sulfonyl chloride group (—$SO_2Cl$ group) as a functional group $Z_5$.

EXAMPLE 12

Iodine Transfer Polymerization Method (2)

A polymer compound having a potassium sulfonic acid group (—$SO_3K$ group) as a functional group $Z_5$ was synthesized according to the same procedures as in Example 11 except that perfluorovinyl sulfonic acid potassium ($CF_2$=$CFSO_3K$) was employed as a first monomer, and the weight of the first monomer put in an autoclave was 20 g.

EXAMPLE 13

Iodine Transfer Polymerization Method (3)

5.7 g of 1,4-diiodoperfluorobutane (I($CF_2)_4$I) as a polymerization initiator, 11 g of perfluorovinyl thiol ($CF_2$=CFSH) as a first monomer, and 10 g of TFE as a second monomer were press-fitted into a stainless-steel autoclave having the internal volume of 1 liter, then beaten and heated to 40° C.

4.5 g of the IPP solution, which was prepared by dissolving 4 g of IPP in 13 g of AK225, was added thereto and the polymerization was performed at 40° C. for 117 hours. The reaction solution was transferred to a stainless-steel beaker, and was washed, filtered and dried to obtain a polymer compound having a thiol group (—SH group) as a functional group $Z_5$.

EXAMPLE 14

Supercritical Fluid Solvent Polymerization Method (1)

A deaerated stainless-steel autoclave having the internal volume of 1 liter was cooled to 0° C. under the argon atmosphere. Then, 200 ml of a TCTFE solution in which 0.96 M bisperfluoropropionyl peroxide ($CF_3CF_2C(=O)OOC(=O)CF_2CF_3$) was dissolved was poured into the autoclave. Further, 18 g of perfluorovinyl sulfonyl chloride ($CF_2=CFSO_2Cl$) as a first monomer and 78 g of a TFE (10 g)/$CO_2$ (68 g) mixture as a second monomer were put in the autoclave at −20° C.

Next, the autoclave was heated to and retained at 35° C. 8 hours later, the contents of the autoclave were transferred to a large stainless-steel beaker. Further, the resulting contents were dried at 80° C. in a vacuum dryer for one night to obtain a polymer compound having a sulfonyl chloride group (—$SO_2Cl$ group) as a functional group $Z_5$.

EXAMPLE 15

Supercritical Fluid Solvent Polymerization Method (2)

A deaerated stainless-steel autoclave having the internal volume of 1 liter was cooled to 0° C. under the argon atmosphere. Then, 150 ml of a TCTFE solution in which 0.96 M bisperfluoropropionyl peroxide ($CF_3CF_2C(=O)OOC(=O)CF_2CF_3$) was dissolved was poured into the autoclave. Further, 18 g of perfluorovinyl sulfonic acid sodium ($CF_2=CFSO_3Na$) as a first monomer and 78 g of a TFE (10 g)/$CO_2$ (68 g) mixture as a second monomer were put in the autoclave at −20° C.

Next, the autoclave was heated to and retained at 35° C. 10 hours later, the contents of the autoclave were transferred to a large stainless-steel beaker. Further, the resulting contents were dried in a vacuum dryer at 80° C. for one night to obtain a polymer compound having a sulfonic acid sodium group (—$SO_3Na$ group) as a functional group $Z_5$.

EXAMPLE 16

Supercritical Fluid Solvent Polymerization Method (3)

A deaerated stainless-steel autoclave having the internal volume of 1 liter was cooled to 0° C. under the argon atmosphere. Then, 100 ml of a TCTFE solution in which 0.96 M bisperfluoropropionyl peroxide ($CF_3CF_2C(=O)OOC(=O)CF_2CF_3$) was dissolved was poured into the autoclave. Further, 11 g of perfluorovinyl thiol ($CF_2=CFSH$) as a first monomer and 78 g of a TFE (10 g)/$CO_2$ (68 g) mixture as a second monomer were put in the autoclave at −20° C. Next, the autoclave was heated to and retained at 35° C. 8 hours later, the contents of the autoclave were transferred to a large stainless-steel beaker. Further, the resulting contents were dried at 80° C. in a vacuum dryer for one night to obtain a polymer compound having a thiol group (—SH group) as a functional group $Z_5$.

COMPARATIVE EXAMPLE 1

A polymer electrolyte was synthesized according to the method disclosed in U.S. Pat. No. 3,624,053. That is to say, 13 g of trifluorovinyl sulfonyl fluoride ($CF_2=CFSO_2F$) as a first monomer, 10 g of TFE as a second monomer, and 30 ml of perfluorodimethylcyclobutane ($C_4F_6(CF_3)_2$) as a solvent were put in a deaerated stainless-steel autoclave. Another container having the internal volume of 60 ml was filled with a mixed gas containing 2.2% by weight of azide fluoride ($N_2F_2$) in a $N_2$ gas to exhibit 630 mmHg.

Next, the mixture gas was discharged into the autoclave and heated to 75° C. 3 hours later, heating was stopped and the contents of the autoclave were transferred to a large stainless-steel beaker. Further, the resulting contents were dried at 80° C. in a vacuum dryer for one night to obtain a polymer compound having a sulfonyl fluoride group (—$SO_2F$ group)

COMPARATIVE EXAMPLE 2

A polymer compound having a sulfonyl chloride group (—$SO_2Cl$ group) was synthesized according to the same procedures as in Example 5 except that the weight of a first monomer put in an autoclave was 14.5 g.

COMPARATIVE EXAMPLE 3

A commercially available Nafion (the registered trademark, manufactured by du Pont) membrane was used as-is for the test.

Polymer electrolyte membranes were prepared from the polymer compounds obtained in Examples 1-15, and Comparative Examples 1 and 2, according to the following procedures. In the case of the polymer compound having the sulfonyl chloride group (—$SO_2Cl$) and the like (i.e. in Examples 1, 2, 5, 8, 9, 11 and 14, and Comparative Examples 1 and 2), firstly, the resulting polymer compound was immersed in a mixed solution of potassium hydroxide (KOH)/dimethyl sulfoxide (DMSO)/water ($H_2O$) which was kept at 30° C. Next, the obtained compound was immersed in a nitrate aqueous solution of 15% by weight which is kept at 50° C. to convert the electrolyte group precursor such as the sulfonyl chloride group to the sulfonic acid group being the electrolyte group. Then, the resulting compound was dissolved in a mixed solution of isopropanol/water ($H_2O$), formed into a membrane of 50 μm thickness by a casting method to obtain a polymer electrolyte membrane.

Incidentally, since the polymer compounds obtained in Examples 1, 2, 5, 8, 9, 11 and 14, and Comparative Examples 1 and 2 melt at 300° C., the membrane may be formed by a melting extrusion method. The membrane was formed by the melting extrusion method at 300° C., and immersed in a mixed solution of potassium hydroxide (KOH)/dimethyl sulfoxide (DMSO)/water ($H_2O$) which was kept at 80° C. Next, the obtained compound was immersed in a nitrate aqueous solution of 15% by weight which was kept at 50° C. to convert the electrolyte group precursor such as the sulfonyl chloride group to the sulfonic acid group being the electrolyte group, and a polymer electrolyte membrane was obtained. The polymer electrolyte membrane prepared by this method did not show the difference in equivalent weight, current-voltage characteristics and durability test results compared with the membrane prepared by the casting method; therefore, results thereof are omitted.

Further, in the case of the polymer compound having the potassium sulfonic acid group (—SO$_3$K) and the like (i.e. in Examples 4, 7, 12 and 15), firstly, the obtained polymer compound was refluxed for 1 hour with 2N hydrochloric acid to convert the electrolyte group precursor such as the potassium sulfonic acid group to the sulfonic acid group being the electrolyte group. Then, the resulting compound was dissolved in a mixed solution of isopropanol/water (H$_2$O), and formed into a membrane of 50 μm thickness by the casting method to obtain a polymer electrolyte membrane.

Furthermore, in the case of the polymer compound having the thiol group (—SH) and the like (i.e. in Examples 3, 6, 10, 13 and 16), firstly, the obtained polymer compound was refluxed with a 30% hydrogen peroxide (H$_2$O$_2$) solution to convert the electrolyte group precursor such as the thiol group to the sulfonic acid group being the electrolyte group. Then, the resulting compound was dissolved in a mixed solution of isopropanol/water (H$_2$O), and formed into a membrane of 50 μm thickness by the casting method to obtain a polymer electrolyte membrane.

Next, the equivalent weight of the membranes obtained in Examples 1-15, and Comparative Examples 1 and 2 respectively was measured by a titrimetric method. FIG. 1 shows the results. In the case of Comparative Example 1 where a monomer having the sulfonyl fluoride group is used as the first monomer, the equivalent weight of the membrane was 14000 g/eq. Also, in the case of Comparative Example 2, the equivalent weight of the membrane was 2850 g/eq.

On the other hand, in the case of Examples 1-15 using a monomer having the sulfonyl chloride group or its alkali metal chloride, or the thiol group as the first monomer, the equivalent weight of the membranes respectively was 2500 g/eq or less.

Figure 2:
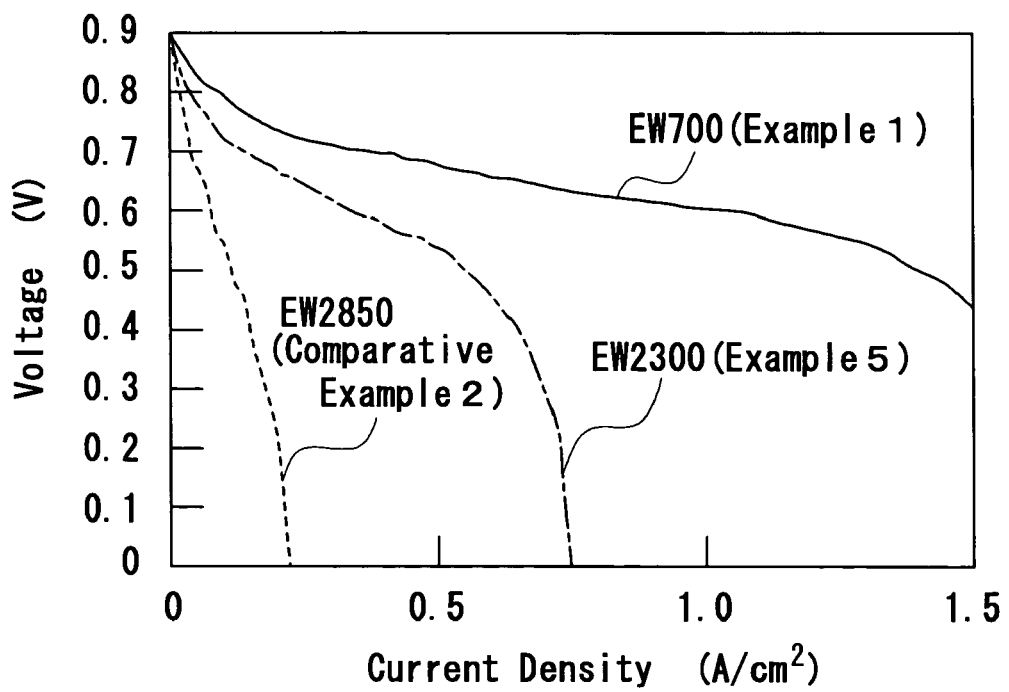
FIG. 2 is a graph illustrating current-voltage characteristics of fuel cells using the membranes obtained in Examples 1 and 5, and Comparative Example 2.

Next, fuel cells were prepared using the membranes obtained in Example 1 (EW700), Example 5 (EW2300) and Comparative Example 2 (EW2850), and the current-voltage characteristics were evaluated. In this connection, a cell with an electrode area of 13 cm$^2$ was used, and cell temperature and bubbler temperature (of both an anode and a cathode) for the test were set at 80° C. The anode was supplied with pure hydrogen at 1.8 l/min and the cathode was supplied with the air at 4.5 l/min. Results are shown in FIG. 2. FIG. 2 indicates that as the equivalent weight of the membrane becomes lower, the current-voltage characteristics become more excellent.

Next, fuel cells were prepared using the membrane obtained in Example 1, which showed the most excellent current-voltage characteristics in FIG. 2, and the commercially available Nafion membrane (Comparative Example 3), and the durability test was conducted. In this connection, a cell with an electrode area of 13 cm$^2$ was used, and cell temperature and bubbler temperature (of both an anode and a cathode) for the test were set at 80° C. The anode was supplied with pure hydrogen at 1.8 l/min and the cathode was supplied with the air at 4.5 l/min, and a time-course change in the voltage at 0.7 A/cm$^2$ was plotted.

Figure 3:
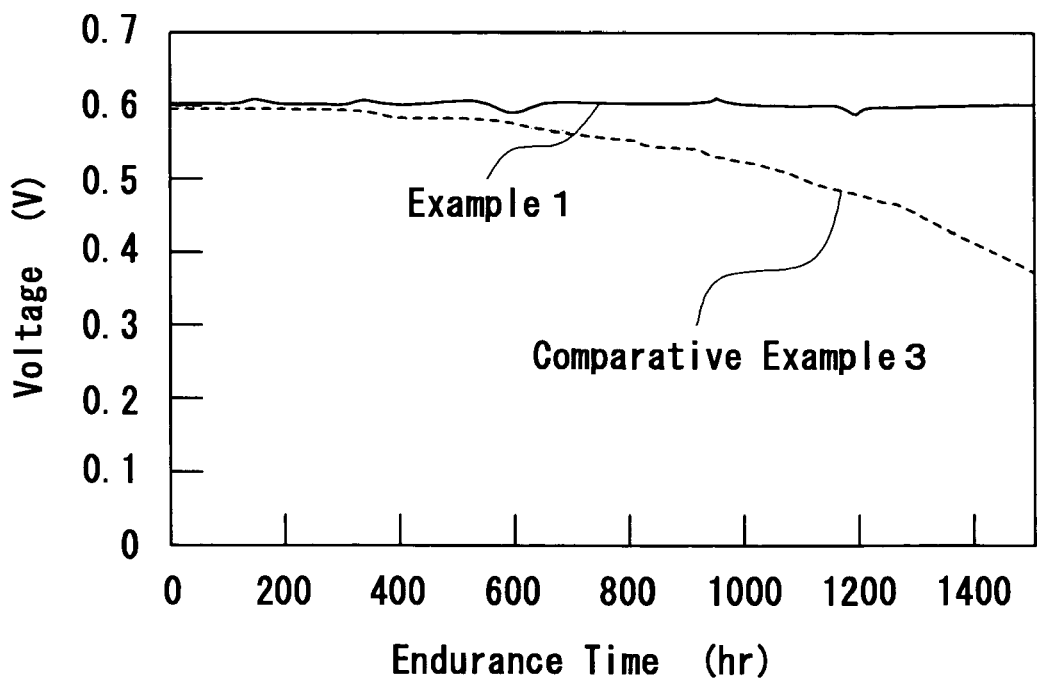
FIG. 3 is a graph illustrating results of a durability test of fuel cells using the membranes obtained in Example 1 and Comparative Example 3.

FIG. 3 shows results of the durability test. In the case of Comparative Example 3 (the Nafion membrane), when endurance time exceeds 400 hours, output voltage started to be gradually lowered, and when the endurance time exceeds 1200 hours, the output voltage was reduced to 0.5 V or less. On the contrary, in the case of Example 1, an initial value of the output voltage (about 0.6 V) was maintained even after the durability test of 1400 hours. The reason of this is considered that as the membrane obtained in Example 1 does not include the ether linkage in the molecule, the deterioration due to the peroxide radical was suppressed.

The present invention is not restricted at all to the embodiments described above but may be modified variously. Its modifications and variations are encompassed within the scope of the present invention so long as they have identical technical ideas with those of the present invention.

For example, in the Examples described above, such cases are explained that the polymer electrolyte consistent with the present invention is used as the electrolyte membrane for the fuel cell. However, the application of the present invention is not restricted thereto, and it may be used also as an electrolyte membrane, an electrolyte in a catalyst layer, and the like for use in various electrochemical devices.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A fuel cell, comprising:
    a polymer electrolyte of high durability comprising:
        a polymer chain which comprises a first repeating unit represented by a general formula

—{C(Z$_1$)(Z$_2$)—C(Z$_3$)(Z$_4$—SO$_3$H)}— wherein
        $Z_1$, $Z_2$, $Z_3$, and $Z_4$ are respectively one of F and $R_{f1}$, F and $R_{f2}$, F and $R_{f3}$, and
        nothing and $R_{f4}$, wherein $Z_1$, $Z_2$ and $Z_3$ are not simultaneously F; and
        each of $R_{f1}$ to $R_{f4}$ is a perfluoroalkyl group in which the carbon number is from 1 to 10 inclusive,
        wherein an equivalent weight is 2500 g/eq or less;
        wherein said polymer electrolyte has no ether linkage;
    wherein a deterioration with time is suppressed even when the polymer electrolyte is used under the operating condition of said fuel cell; and
    wherein the percentage of reduction in output voltage at 1000 hours of a durability test is not more than 50% of the percentage of reduction in output voltage at 1000 hours of a durability test of a wholly fluorinated electrolyte having an ether linkage.

2. The fuel cell according to claim 1, wherein the polymer chain of said polymer electrolyte has a molecular structure in straight chain form.

3. The fuel cell according to claim 2, wherein the polymer chain of said polymer electrolyte further comprises a second repeating unit represented by a general formula

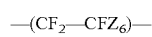

wherein
    $Z_6$ is one member selected from the group consisting of F and $R_{f6}$; and
    $R_{f6}$ is a perfluoroalkyl group in which the carbon number is from 1 to 10 inclusive.

4. The fuel cell according to claim 1, wherein the polymer chain of said polymer electrolyte further comprises a second repeating unit represented by a general formula $$-(CF_2-CFZ_6)-$$

wherein $Z_6$ is one member selected from the group consisting of F and $R_{f6}$; and $R_{f6}$ is a perfluoroalkyl group in which the carbon number is from 1 to 10 inclusive.

5. A process for producing a fuel cell, comprising:

synthesizing a polymer compound by polymerizing at least one kind of first monomer represented by a general formula $$C(Z_1)(Z_2)=C(Z_3)(Z_4-Z_5)$$

wherein $Z_1$, $Z_2$, $Z_3$, and $Z_4$ are respectively one of F and $R_{f1}$, F and $R_{f2}$, F and $R_{f3}$, and nothing and $R_{f4}$, wherein $Z_1$, $Z_2$ and $Z_3$ are not simultaneously F;

$Z_5$ is one of $-SO_2X$, $-SO_2M_1$, $-SO_3M_2$, and $-SM_3$;

X is one of Cl, Br and I;

each of $M_1$, $M_2$ and $M_3$ is one member selected from the group consisting of H, an univalent metal, a bivalent metal, a trivalent metal, a transition metal, and $R_{f7}$; and each of $R_{f1}$ to $R_{f4}$ and $R_{f7}$ is a perfluoroalkyl group in which the carbon number is from 1 to 10 inclusive; and converting a functional group $Z_5$ contained in the polymer compound synthesized in the first step into a sulfonic acid group; thereby obtaining a polymer electrolyte of high durability;

wherein said polymer electrolyte has no ether linkage;

including said polymer electrolyte in a fuel cell as an electrolyte membrane;

wherein a deterioration with time is suppressed even when the polymer electrolyte is used under the operating condition of said fuel cell; and wherein the percentage of reduction in output voltage at 1000 hours of a durability test is not more than 50% of the percentage of reduction in output voltage at 1000 hours of a durability test of a wholly fluorinated electrolyte having an ether linkage.

6. The process of claim 5, wherein said univalent metal is Na, K or Li, said bivalent metal is Ca or Mg, said trivalent metal is Al, and said transition metal is Fe, Ni or Co.

7. A process for producing a fuel cell, comprising:

synthesizing a polymer compound by copolymerizing at least one kind of first monomer represented by a general formula $$C(Z_1)(Z_2)=C(Z_3)(Z_4-Z_5)$$

wherein $Z_1$, $Z_2$, $Z_3$, and $Z_4$ are respectively one of F and $R_{f1}$, F and $R_{f2}$, F and $R_{f3}$, and nothing and $R_{f4}$, wherein $Z_1$, $Z_2$ and $Z_3$ are not simultaneously F;

$Z_5$ is one member selected from the group consisting of $-SO_2X$, $-SO_2M_1$, $-SO_3M_2$, and $-SM_3$;

X is one member selected from the group consisting of Cl, Br and I;

each of $M_1$, $M_2$ and $M_3$ is one member selected from the group consisting of H, an univalent metal, a bivalent metal, a trivalent metal, a transition metal, and $R_{f7}$; and each of $R_{f1}$ to $R_{f4}$ and $R_{f7}$ is a perfluoroalkyl group in which the carbon number is from 1 to 10 inclusive, with a second monomer represented by a general formula $$CF_2=CFZ_6$$

wherein $Z_6$ is one member selected from the group consisting of F and $R_{f6}$;

$R_{f6}$ is a perfluoroalkyl group in which the carbon number is from 1 to 10 inclusive; and a second step of converting a functional group $Z_5$ contained in the polymer compound synthesized in the first step into a sulfonic acid group; thereby obtaining a polymer electrolyte of high durability;

wherein said polymer electrolyte has no ether linkage;

including said polymer electrolyte in a fuel cell as an electrolyte membrane;

wherein a deterioration with time is suppressed even when the polymer electrolyte is used under the operating condition of said fuel cell; and wherein the percentage of reduction in output voltage at 1000 hours of a durability test is not more than 50% of the percentage of reduction in output voltage at 1000 hours of a durability test of a wholly fluorinated electrolyte having an ether linkage.

8. The process of claim 7, wherein said univalent metal is Na, K or Li, said bivalent metal is Ca or Mg, said trivalent metal is Al, and said transition metal is Fe, Ni or Co.

9. A fuel cell, consisting of:

a polymer chain consisting of a repeating unit represented by a general formula $$-\{C(Z_1)(Z_2)-C(Z_3)(Z_4-SO_3H)\}-$$

wherein $Z_1$, $Z_2$, $Z_3$, and $Z_4$ are respectively one of F and $R_{f1}$, F and $R_{f2}$, F and $R_{f3}$, and nothing and $R_{f4}$, wherein $Z_1$, $Z_2$ and $Z_3$ are not simultaneously F; and each of $R_{f1}$ to $R_{f4}$ is a perfluoroalkyl group in which the carbon number is from 1 to 10 inclusive, wherein an equivalent weight is 2500 g/eq or less;

wherein said polymer electrolyte has no ether linkage;

wherein a deterioration with time is suppressed even when the polymer electrolyte is used under the operating condition of said fuel cell; and wherein the percentage of reduction in output voltage at 1000 hours of a durability test is not more than 50% of the percentage of reduction in output voltage at 1000 hours of a durability test of a wholly fluorinated electrolyte having an ether linkage.

10. A fuel cell, consisting of:

a polymer chain consisting of a first repeating unit represented by a general formula $$-\{C(Z_1)(Z_2)-C(Z_3)(Z_4-SO_3H)\}-$$

wherein $Z_1$, $Z_2$, $Z_3$, and $Z_4$ are respectively one of F and $R_{f1}$, F and $R_{f2}$, F and $R_{f3}$, and nothing and $R_{f4}$, wherein $Z_1$, $Z_2$ and $Z_3$ are not simultaneously F; and each of $R_{f1}$ to $R_{f4}$ is a perfluoroalkyl group in which the carbon number is from 1 to 10 inclusive, and a second repeating unit represented by a general formula $$-(CF_2-CFZ_6)-$$

wherein $Z_6$ is one member selected from the group consisting of F and $R_{f6}$; and $R_{f6}$ is a perfluoroalkyl group in which the carbon number is from 1 to 10 inclusive, wherein an equivalent weight is 2500 g/eq or less;

wherein said polymer electrolyte has no ether linkage;

wherein a deterioration with time is suppressed even when the polymer electrolyte is used under the operating condition of said fuel cell; and wherein the percentage of reduction in output voltage at 1000 hours of a durability test is not more than 50% of the percentage of reduction in output voltage at 1000 hours of a durability test of a wholly fluorinated electrolyte having an ether linkage.

* * * * *